June 20, 1967 W. H. GARTLEY 3,325,908
DUAL FUNCTION SAFETY THERMOSTAT FOR DRYERS
Filed Jan. 7, 1965 3 Sheets-Sheet 1

INVENTOR.
William H. Gartley
BY
ATTORNEYS

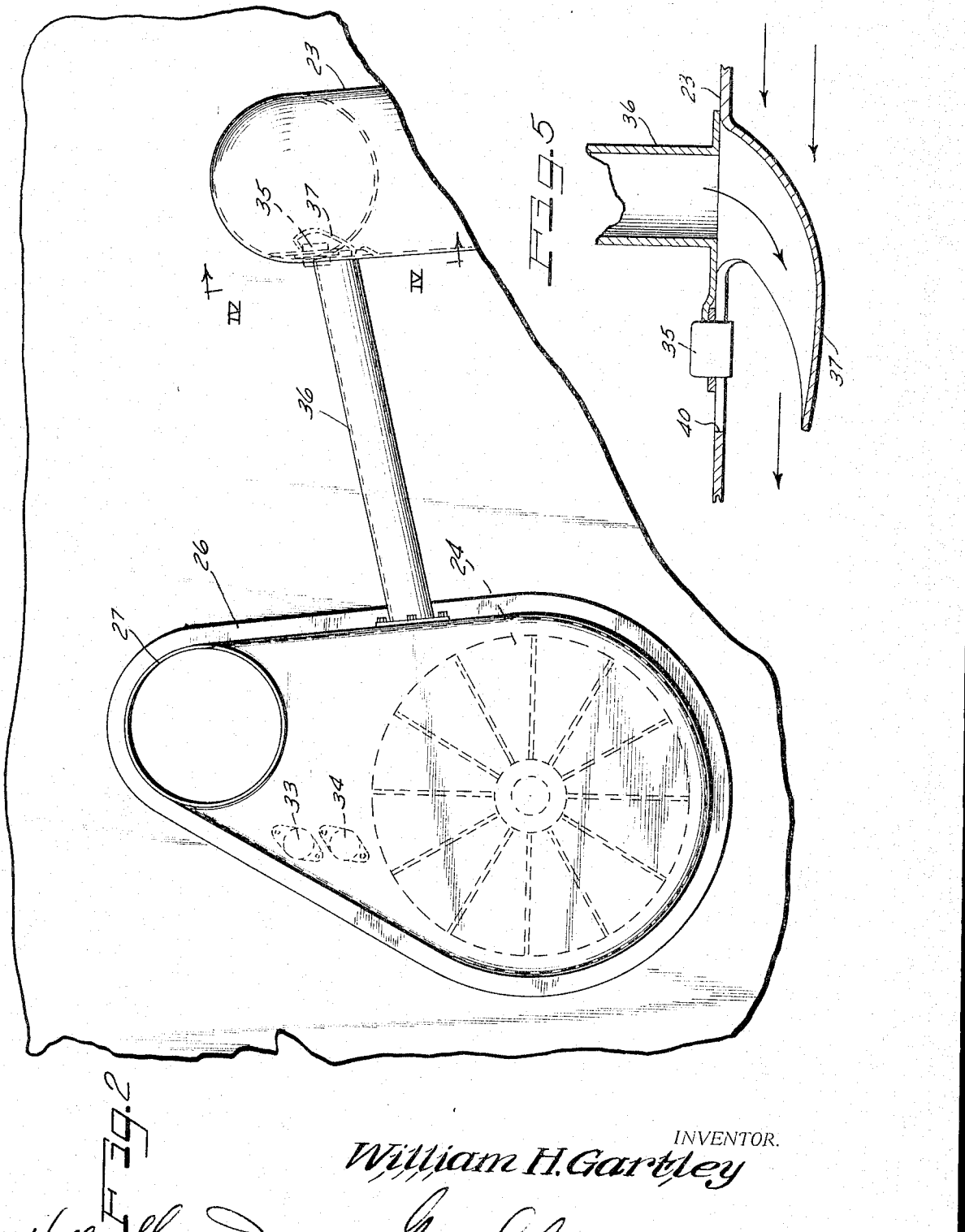

June 20, 1967  W. H. GARTLEY  3,325,908
DUAL FUNCTION SAFETY THERMOSTAT FOR DRYERS
Filed Jan. 7, 1965  3 Sheets-Sheet 3
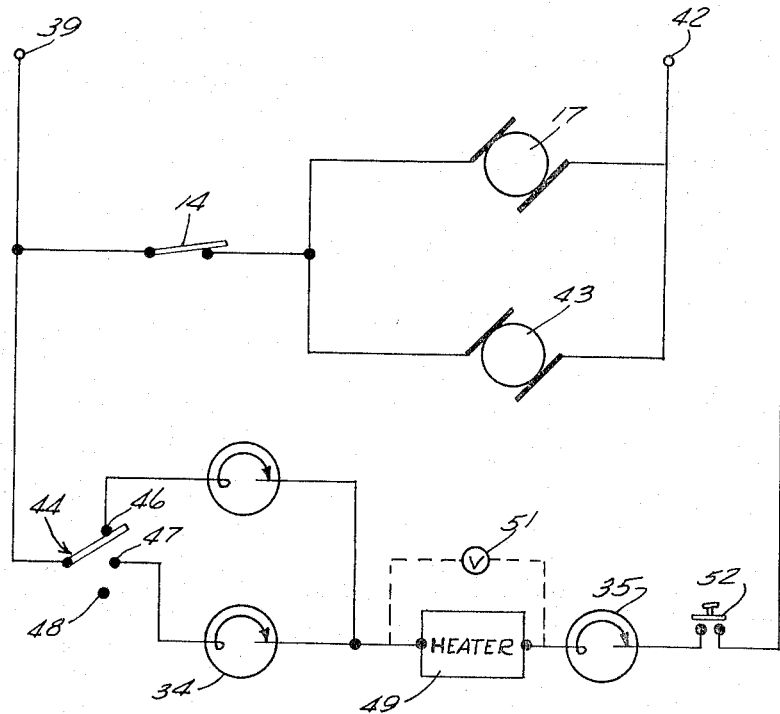
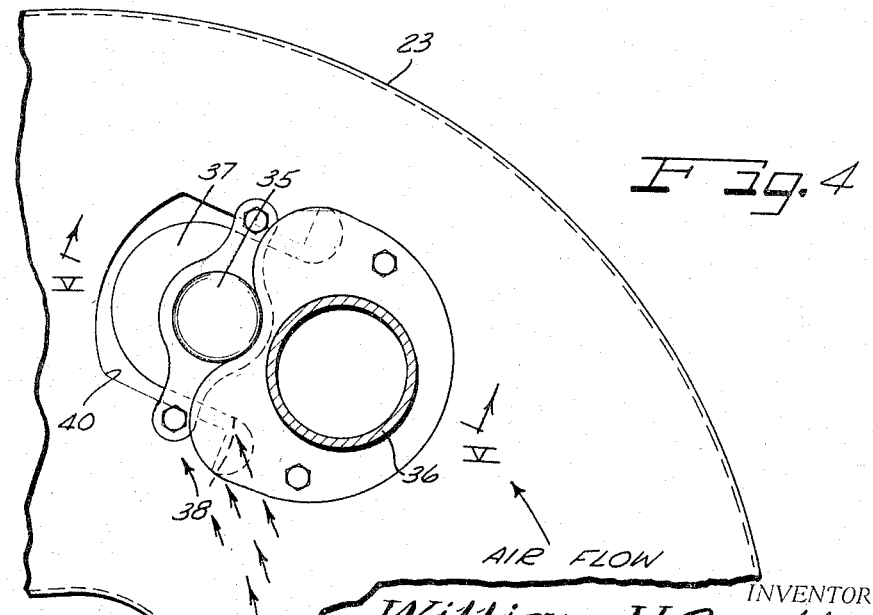
INVENTOR.
William H. Gartley
BY Hill, Sherman, Meroni, Gross & Simpson
ATTORNEYS

United States Patent Office 3,325,908
Patented June 20, 1967

3,325,908
DUAL FUNCTION SAFETY THERMOSTAT FOR DRYERS
William H. Gartley, St. Joseph, Mich., assignor to Whirlpool Corporation, Benton Harbor, Mich., a corporation of Delaware
Filed Jan. 7, 1965, Ser. No. 424,085
12 Claims. (Cl. 34—48)

The present invention relates to improvements in clothes dryers, particularly in the control of the heating unit to avoid excessive temperature build up within the dryer.

Clothes dryers conventionally provide some type of protection against failures in the air and heating systems. Two failures which must particularly be guarded against, since they may cause a hazardous condition if not detected are, first, the lack of air flow (which may be caused by a broken blower drive belt, a blocked lint screen or other blockage in the venting system) and, second, a failure in the normal operating exhaust thermostat which controls the heat input to a predetermined level. In the past, it has been common practice to position a safety thermostat in the air stream on the inlet side of the drying chamber in proximity to the heat source to detect and protect against the lack of air flow. Another safety thermostat was then located in the air stream on the exhaust side to detect the existence of the second difficulty.

Both safety thermostats were necessary because excessive temperatures due to failures causing lack of air flow are not in general detectable at the exhaust of conventional dryers and of course excessive temperatures due to failures of exhaust operating thermostats are not detectable at the inlet of conventional dryers.

The present invention provides a coordinated system whereby a single safety thermostat is used to provide protection against both of the hazardous conditions mentioned previously. In accordance with the present invention, I provide means for recirculating at least a part of the air being vented from the dryer through the normal exhaust conduit back into the inlet conduit for the dryer drum. A safety thermostat is positioned in the inlet conduit for the drum, and is responsive to the temperature of the air therein. The air recirculated from the exhaust to the inlet is directed over the safety thermostat in a manner which provides cooling of the safety thermostat relative to the normal inlet temperature, which temperature, however, also has an effect on the safety thermostat. If, for some reason, the air flow is restricted or stopped, the termination of cooling of the safety thermostat by the relatively cooler air recirculated from the exhaust conduit causes the temperature in the inlet to rise above the operating temperature of the safety thermostat, thereby opening the circuit to the electrically energized heat source. If the operating thermostat located in the exhaust vent should fail in a closed position, the recirculating exhaust air becomes hotter than normal, and also causes the safety thermostat located in the inlet conduit to open.

One of the objects of the present invention is to provide an improved dryer assembly employing a single safety thermostat which detects an insufficient air flow, and a malfunction of the operating thermostat in the dryer.

Still another object of the invention is to provide an improved dryer system which eliminates the necessity for plural safety thermostats without eliminating any safety functions.

Other objects and features of the present invention will become apparent to those skilled in the art from the following description of the attached sheets of drawings in which:

FIGURE 2 is a view in elevation of the blower and conduit assemblies in the present invention showing the manner in which a small amount of air is recirculated from the exhaust means to the inlet means;

FIGURE 3 is a circuit diagram illustrating the manner in which the thermostatic elements are included in the circuit of the dryer; and FIGURE 4 is a fragmentary view in elevation substantially along line IV—IV of FIGURE 2, showing the manner in which the safety thermostat is associated with the inlet conduit for the dryer drum.

FIGURE 5 is a sectional view taken substantially along line V—V of FIGURE 4.

As shown in the drawings:

Figure 1:
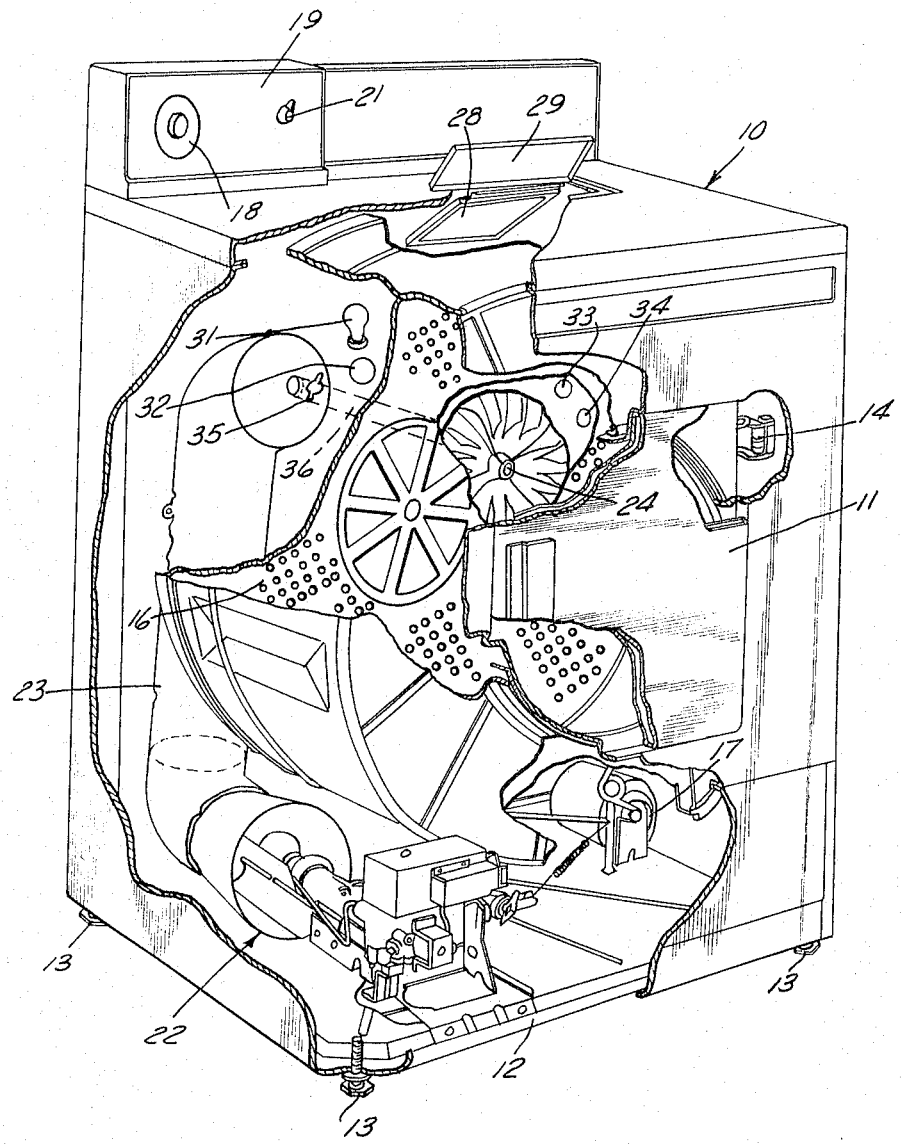
FIGURE 1 is a view in perspective, partially broken away, to illustrate the subject matter of the present invention as applied to a commercial machine.

In the illustrative embodiment shown in FIGURE 1, reference numeral 10 indicates generally a cabinet housing the components of a gas fired dryer, the cabinet 10 being provided with an access door 11 and being supported on a base 12 which rests on a plurality of individually adjustable legs 13. A door switch 14 is provided to serve as an interlock, to deenergize the circuitry when access door 11 is opened.

Inside the cabinet 10 there is a perforate, rotatable drum 16 in which the clothes being dried are tumbled during the drying operation and subjected to heated air in the process. The drum 16, as well as the other rotary elements of the dryer are driven from a motor 17 secured to the base 12.

A selector dial 18 is located on an upstanding panel 19 and provides the operator with a choice of drying cycles, depending upon the particular fabrics being dried. In the form of the invention illustrated, the machine is also provided with a selector switch 21 to permit the operator to choose between a relatively slow speed drying operation and a relatively high speed, the former being used primarily for delicate fabrics, and the latter for heavier, bulkier materials.

Hot air is supplied to the drum 16 through the provision of a suitable heating means which, in the illustrated instance, takes the form of a gas burner assembly generally indicated at reference numeral 22 in FIGURE 1. Heated air from the burner assembly 22 passes into an inlet conduit 23 which discharges into the interior of the drum 16, and is pulled therethrough by the action of air translation means, illustrated by a blower 24 located in the exhaust system and supported for rotation within a housing 26 (FIGURE 2). A major portion of the air drawn through the drier by the blower 24 is vented from the assembly through an outlet conduit 27, and in leaving the assembly, the air is passed through a lint filter 28 which is accessible from the top of the cabinet 10 by the provision of an access door 29.

An incandescent lamp 31 may be mounted behind the drum 16 to illuminate the same, and an ultraviolet lamp 32 may be positioned in proximity to the drum 16 to freshen the clothes during drying.

The assembly of FIGURE 1 is provided with a pair of operating thermostats 33 and 34 located in the exhaust conduit system in close proximity to the blower 24. The thermostats 33 and 34 are arranged to open at different temperatures, and are selectively introduced into the circuitry of the dryer by the manipulation of the selector switch 21.

A safety thermostat 35 is positioned in the inlet conduit 23 upstream of the heating means 22 and is responsive to temperatures in that conduit. In accordance with the present invention, the temperature of the air passing through the inlet conduit 23 and into the drum 16 is modified by recirculating a portion of the heated air being vented from the exhaust conduit, by providing a recirculation conduit 36 between the exhaust conduit and the inlet conduit 23. As seen in FIGURES 2, 4 and 5, a deflector and shield assembly 37 may be positioned at the junction between the recirculation conduit 36 and the inlet conduit 23 to insure that the recirculated air is directed over the safety thermostat 35. A certain amount of the inlet air finds its way around the shield 37 and mixes with the recirculated air. The safety thermostat 35 is thereby made responsive to the temperature of the mixture of the heated air being supplied to the drum, and the relatively cooler recirculating air being introduced through the recirculation conduit 36.

Under normal air flow conditions the recirculated exhaust air will be the major influence on the safety thermostat 35 because of the position of shield 37 which blocks the inlet air from the safety thermostat except for minor amounts which pass over an edge 38 of shield 37. This may best be understood by reference to FIGURE 4 where shield 37 is shown at an elbow of inlet conduit 23. Inlet air must change its direction of flow at this point of the inlet conduit, but due to inertia the change in flow direction is not completely axially of conduit 23 and the inlet air passes shield 37 at a slight angle to the shield as indicated by the arrows. Thus, a small amount of the inlet air passes over edge 38 of shield 37 and mixes with the recirculated exhaust air. The safety thermostat is set at a temperature higher than the exhaust operating thermostats and therefore as long as the operating thermostats are functioning properly the exhaust air remains cool enough to preclude tripping of the safety thermostat. Should the exhaust operating thermostat fail, the recirculated exhaust air becomes hotter and trips the safety thermostat while exhaust temperature is still at a safe though elevated level.

In the event of low or no air flow, the cooling effect of the recirculated exhaust air is lessened or eliminated and inlet air consequently has more influence on the safety thermostat. In order to insure at least some air flow past safety thermostat 35 in the event of blower failure, a small opening 40 is provided in conduit 23 on the upstream side of safety thermostat 35. If then the blower fails the conduit 23 acts as a chimney with the opening 40 providing a draft. The safety thermostat will then quickly trip under the influence of the relatively hot inlet air and damage to the dryer will be avoided.

The electrical circuit for the dryer assembly is shown, in parallel and are selectively introduced into the circuit 41 represent the terminals of a high voltage line such as a 240 volt alternating current line. A third terminal 42 provides a potential of 120 volts between itself and terminal 39. When the door switch 14 is closed, the main dryer motor 17 is energized, as a timer motor 43 which is connected in parallel to the dryer motor 17. The timer 43 programs the operation of the dryer through a desired sequence of operations, for predetermined time intervals. The construction and operation of such timer motors is well known in the art, and does not form a feature of the present invention.

The two operating thermostats 33 and 34 are connected in parallel and are relatively introduced into the circuit by the operation of a switch arm 44 which is positionable with a series of contacts 46, 47 and 48 in response to movement of selector switch 21. When the switch arm 44 closes the circuit to the terminal 46, the thermostat 33 is introduced into the electrical circuit, and when it contacts the contact 47, the thermostat 34 is introduced into the circuit. Switch arm 44 has one other operating position, when it contacts contact 48, to deenergize the heating circuits, and permit unheated air to be blown through the drum during a portion of the drying cycle.

The two thermostats 33 and 34 are in series with the heating means which may constitute an electrical heater element 49 of the resistance heater type, or, in the case of a gas fired dryer, an electrically operated valve 51 may be employed to control the amount of gas flow to the burner assembly 22. The electrical control means, whether it be the resistance heater 49 or the electrically operated valve 51 is in series with the safety thermostat 35 located in the inlet conduit 23. A centrifugal switch 52 is also provided, the switch 52 being designed to close when the rotational speed of the drum 16 reaches a predetermined value, so that adequate rotation of the drum is assured before heat is applied to the air entering the drum.

The operation of the assembly should be evident from the foregoing discussion. When the main drive motor 17 and the timer motor 43 are first turned on, the drum 16 begins to rotate, and the timer motor 43 initiates its programmed cycle. When the centrifugal switch 52 closes, one or the other of the thermostats 33 and 34 is placed in the heater circuit, along with the safety thermostat 35. As long as the temperatures at the inlet conduit 23 and the outlet conduit 27 are within the limits prescribed by the characteristics of the thermostats, normal operation will continue. If, however, some malfunctioning should occur such as a broken drive belt at the blower, the temperature in the inlet conduit will become excessively high, and will cause the safety thermostat 35 to open, thereby deenergizing the heating circuit. The same result will be accomplished if the malfunction was due to a blocked lint screen or by failure of one of the operating thermostats.

It should be evident that various modifications can be made to the described embodiments without departing from the scope of the present invention.

The embodiments of the invention in which an exclusive property or privilege is claimed are defined as follows:

1. In a dryer assembly
   a rotatable drum,
   inlet conduit means for introducing heated air into said drum,
   outlet conduit means for venting air from said drum,
   a thermostat repsonsive to temperatures in said inlet conduit means, and
   recirculating means connecting said outlet conduit means with said inlet conduit means to recirculate at least a portion of the air being vented from said drum to said inlet conduit means whereby said thermostat is responsive to the temperature in said inlet conduit means as modified by the air recirculated from said outlet conduit means.

2. In a dryer assembly
   a rotatable drum,
   gas burner means positioned outside said drum,
   inlet conduit means delivering heated air from said burner means into said drum,
   outlet conduit means for venting air from said drum,
   a thermostat positioned to be responsive to the temperature of the air in said inlet conduit means,
   conduit means connecting said outlet conduit means to said inlet conduit means to thereby recirculate a portion of the air from said outlet conduit means to said inlet conduit means, and
   circuit means connecting said thermostat to said gas burner means to deenergize said burner means when the temperature sensed by said thermostat reaches a predetermined level.

3. In a dryer assembly,
   a rotatable drum,
   electrical heater means positioned outside said drum,
   inlet conduit means delivering heated air from said heater means into said drum,
   outlet conduit means for venting air from said drum,
   a thermostat positioned to be responsive to the temperature of the air in said inlet conduit means,
   conduit means connecting said outlet conduit means to said inlet conduit means to thereby recirculate a portion of the air from said outlet conduit means to said inlet conduit means, and circuit means connecting said thermostat to said electrical heater means to deenergize said electrical heater means when the temperature sensed by said thermostat reaches a predetermined value.

4. In a dryer assembly,
a rotatable drum,
electrically energizable heating means positioned outside said drum,
inlet conduit means delivering heated air from said heating means into said drum,
outlet conduit means venting air from said drum,
a first thermostat positioned to sense the temperature of the air at said outlet conduit means,
means connecting said outlet conduit means with said inlet conduit means to recirculate a portion of the air thereto,
and a second thermostat positioned to sense the temperature of air in said inlet conduit means,
said first and second thermostats being electrically connected in series with said electrically energizable heating means.

5. In a dryer assembly,
a rotatable drum,
electrically energizable heating means positioned outside said drum,
inlet conduit means delivering heated air from said heating means into said drum,
outlet conduit means venting air from said drum,
a pair of thermostats responsive to different maximum temperatures selectively energizable to sense the temperatures of the air at said outlet conduit means,
means connecting said outlet conduit means with said inlet conduit means to recirculate a portion of the air therethrough,
and a third thermostat positioned to sense the temperature of air in said inlet conduit means,
said third thermostat being electrically connected in series with said pair of thermostats and in series with said electrically energizable heating means.

6. The assembly of claim 5 in which said electrically energizable heating means includes a gas burner and an electrically operated valve therefor.

7. The assembly of claim 5 in which said electrically energizable heating means includes an electrical resistance heating element.

8. In a dryer:
a clothes tumbling drum;
an inlet conduit communicating with said clothes tumbling drum;
heating means in said inlet conduit;
an exhaust conduit for venting air from said clothes tumbling drum;
air translation means for moving air through said inlet conduit, past said heating means, through said clothes tumbling drum and through said exhaust conduit;
conduit means interconnected between said exhaust conduit and said inlet conduit and forming a junction with said inlet conduit for recirculating a portion of air from said exhaust conduit to said inlet conduit when said air translation means is operated; and
a thermostat in said inlet conduit upstream of said heating means and said junction, said thermostat being connected to said heating means and operative to deactivate said heating means upon sensing a predetermined air temperature in said inlet conduit.

9. The invention of claim 8 wherein said thermostat is positioned adjacent said junction.

10. The invention of claim 9 including shield means positioned in said inlet conduit to direct recirculated air from said exhaust conduit over said thermostat and to deflect a major portion of air entering said inlet conduit away from said thermostat, whereby when said air translating means is operating said thermostat is primarily under the influence of said recirculated air and when said air translation means is not operating said thermostat is primarily under the influence of said air entering said inlet conduit.

11. The invention of claim 10 wherein said inlet conduit has an opening formed therein adjacent said thermostat and upstream therefrom.

12. In a dryer assembly,
a rotatable drum,
inlet conduit means for introducing heated air into said drum,
outlet conduit means for venting air from said drum,
a thermostat,
recirculating means connecting said outlet conduit means with said inlet conduit means to recirculate at least a portion of the air being vented from said drum to said inlet conduit means,
and means for mounting said thermostat in heat communication with the heated air and the recirculated portion of the vented air in said inlet conduit whereby said thermostat is responsive to the temperature in said inlet conduit means as modified by the air recirculated from said outlet conduit means.

References Cited
UNITED STATES PATENTS

| | | | |
|---|---|---|---|
| 2,619,736 | 12/1952 | Geldhof | 34—131 |
| 2,635,354 | 4/1953 | Geldhof et al. | 34—131 |
| 2,678,814 | 5/1954 | Geldhof et al. | 34—131 X |
| 2,722,057 | 11/1955 | Pugh | 34—131 X |
| 2,827,276 | 3/1958 | Racheter | 263—33 |

FREDERICK L. MATTESON, Jr., *Primary Examiner.*

C. R. REMKE, *Assistant Examiner.*